(12) United States Patent
Xu

(10) Patent No.: US 11,954,120 B2
(45) Date of Patent: Apr. 9, 2024

(54) BLOCKCHAIN METHOD AND SYSTEM, AND COMPUTER READABLE STORAGE MEDIUM

(71) Applicant: Hao Xu, Anhui (CN)

(72) Inventor: Hao Xu, Anhui (CN)

(*) Notice: Subject to any disclaimer, the term of this patent is extended or adjusted under 35 U.S.C. 154(b) by 0 days.

(21) Appl. No.: 17/896,316

(22) Filed: Aug. 26, 2022

(65) Prior Publication Data

US 2022/0414120 A1 Dec. 29, 2022

Related U.S. Application Data

(63) Continuation-in-part of application No. PCT/CN2021/076183, filed on Feb. 9, 2021.

(30) Foreign Application Priority Data

Mar. 4, 2020 (CN) .......................... 202010144044.7

(51) Int. Cl.
| | |
|---|---|
| *G06F 16/22* | (2019.01) |
| *G06F 16/27* | (2019.01) |
| *G06F 16/332* | (2019.01) |
| *G06F 16/901* | (2019.01) |
| *G06Q 20/38* | (2012.01) |
| *G06Q 20/40* | (2012.01) |

(52) U.S. Cl.
CPC .......... *G06F 16/27* (2019.01); *G06F 16/2246* (2019.01); *G06F 16/3329* (2019.01); *G06F 16/9024* (2019.01); *G06Q 20/382* (2013.01); *G06Q 20/3827* (2013.01); *G06Q 20/401* (2013.01)

(58) Field of Classification Search
CPC .. G06F 16/27; G06F 16/2246; G06F 16/9024; G06F 16/3329
See application file for complete search history.

(56) References Cited

U.S. PATENT DOCUMENTS

| | | | |
|---|---|---|---|
| 10,430,430 B2* | 10/2019 | Muller | G06F 16/2471 |
| 11,210,593 B1* | 12/2021 | Yue | G06F 16/168 |
| 11,372,817 B2* | 6/2022 | Irazabal | G06F 16/1837 |
| 11,455,380 B2* | 9/2022 | Patel | H04L 9/0637 |
| 2014/0074679 A1* | 3/2014 | van Coppenolle | G06Q 40/02 705/35 |
| 2018/0082290 A1 | 3/2018 | Allen et al. | |
| 2018/0225660 A1* | 8/2018 | Chapman | G06Q 20/389 |
| 2020/0159847 A1* | 5/2020 | Smith | G06F 16/2379 |
| 2021/0117938 A1* | 4/2021 | Arora | G06Q 20/02 |

FOREIGN PATENT DOCUMENTS

| | | |
|---|---|---|
| CN | 109472696 A | 3/2019 |
| CN | 109583905 A | 4/2019 |
| CN | 110458700 A | 11/2019 |
| CN | 111368001 A | 7/2020 |

OTHER PUBLICATIONS

International search report of PCT/CN2021/076183.

* cited by examiner

*Primary Examiner* — Etienne P Leroux

(57) ABSTRACT

The present invention is a system and method for recording right transfer in blockchain. There are three types of tokens, each of which may include a definition of rights. The rights can also be split or merged during circulation of tokens. The blockchain system ensures totality of rights does not increase nor decrease before and after circulation.

18 Claims, 7 Drawing Sheets

BLOCKCHAIN METHOD AND SYSTEM, AND COMPUTER READABLE STORAGE MEDIUM

CROSS REFERENCE TO RELATED APPLICATION

This patent application claims the benefit and priority of Chinese Patent Application No. 202010144044.7, filed on Mar. 4, 2020, the disclosure of which is incorporated by reference herein in its entirety as part of the present application.

TECHNICAL FIELD

The present invention is related to the fields of blockchain technologies. Specifically, the present invention is related to a blockchain method, system and computer-readable storage medium.

BACKGROUND

A blockchain is a distributed ledger system that includes a distributed network of nodes, each running a ledger program according to the same blockchain protocol. Each transaction comprises of input and output tokens. Token is a cryptographically certified value that can be circulated in the blockchain. Tokens comprise of value and ownership components. Traditionally, the value component of a token takes a form of single number, which we call numerical token. Such as a Bitcoin token, setting aside what is related to cryptograph and ownership, the core content of a Bitcoin token is the amount of Bitcoins. A limitation of such traditional numerical tokens is that tokens can only be split and merged in quantity, and cannot be split and merged by equitable rights. For example, traditionally, the membership rights of a movie theater represented by a numerical token can only be transferred to others in its entirety, instead of transferring part of the membership rights and keeping the rest membership rights to the original owner.

SUMMARY

The present invention provides a blockchain method, aiming to solve the technical problems mentioned above.

The present invention is implemented in this way, a blockchain method, the method specifically includes the following steps:
S1. Receive transaction or block, the block comprises of packed transactions;
S2. Verify whether the received transaction or the transactions in the block are legal;
S3. If the received block is legal, add the block to the end of the local blockchain data; if the received transaction is legal, keep the transaction, and periodically pack the received legal transactions into block, add the packed block to the end of the local blockchain data and broadcast it to other nodes in the blockchain network;

The transactions contain tokens, and a token contains a value and a right set, the right set is a set of rights, and a right is an index or a handle referencing a node in the right forest.

A value is one of a number, a geometric object or a monodromy. Monodromies may be identifications of things.

Right forest consists of a collection of right trees. A right tree is a tree data structure. Right nodes in a right tree contain descriptions of the right scopes. Child right nodes of a right node always exist in pairs, which is called child right node pair. The right scopes of a pair of child nodes are complementary within the right scope of their parent right node.

Further, verifying the legitimacy of the transaction includes verifying the integrity of the transaction. When the values are numbers, verifying the integrity of the transaction specifically includes the following steps:
21) Split each token in the input token group and the output token group into simple tokens. Each simple token contains only one right of the right set of the token. The value of the simple token is the same as the value of the token. After splitting, the simple tokens form an input simple token group and an output simple token group respectively;
22) Based on 221), 222) and 223), merge the tokens in the input simple token group and the output simple token group until the input simple token group and the output simple token group are the same, or there are no tokens can be merged. If the merged input simple token group is the same as the merged output simple token group, the transaction is integral.
221) If there are two simple tokens with the same value and complementary rights under the same parent right in the input simple token group or the output simple token group, then merge the two simple tokens into a token whose value is the same as the simple tokens and the right set only contains the parent right.
222) If there are two simple tokens with different values and complementary rights under the same parent right in the input simple token group or the output simple token group, then merge the two tokens to form token A and B. The value of token A is the lesser of the values in the simple tokens, and the right set only contains the parent right. The value of token B is the difference of the values of the two simple tokens, and the right set is the right set of the simple token with greater value.
223) If there are two simple tokens with the same right set in the input simple token group or the output simple token group, the two simple tokens is merged to form a token whose value is the sum of the values of the two simple tokens and whose right set is the right set of the tokens.

Further, verifying the legitimacy of the transaction includes verifying the integrity of the transaction. When the values of tokens are geometric objects, verifying integrity of transactions includes the following steps:
31) Construct an elementary right set for the transaction;
32) For each right in the elementary right set, find the matching input tokens and matching output tokens covering the right respectively and construct a group of matching input geometric objects and a group of matching output geometric objects to include geometric objects in the groups of matching tokens respectively. Optionally, merge the geometric objects in matching input tokens and matching output tokens respectively. Verify whether the group of matching input geometric objects and the group of matching output geometric objects are geometrically integral. If the test result is affirmative, the transaction is integral under the elementary right;
33) A transaction is integral if it is integral under every elementary right;

An elementary right set is a set of rights where no right in the set is the ancestor of another right in the set and any right in a right set of an input token or an output token is either in the elementary right set or can be formed by complementarily merging rights in the elementary right set.

Geometrically integrity: If an input group of geometric objects and an output group of geometric objects are the same, the input group of geometric objects and the output group of geometric objects are geometrically integral.

Further, the input group of geometric objects and the output group of geometric objects are the same if they satisfy conditions 1 and 2. Conditions 1 and 2 are as follows:

Condition 1: There is no spatial overlap among the geometric objects in the output group;

Condition 2: The space occupied by all input geometric objects is the same as the space occupied by all output geometric objects;

Further, the geometric objects in the transactions are polygons, and a polygon comprises of a group of loops. A loop is an ordered list of directional borders. Directional border contains border and direction information, and border forest is a collection of border trees. A border tree is a tree data structure. Border is an index or handle referencing a node in the border tree, and a node of the border tree represents the zigzag lines formed by the edges represented by all leaf nodes in the sub-tree rooted at the node.

Merge all polygons in matching input tokens and all polygons in matching output tokens respectively to form a group of input merged polygons and a group of output merged polygons.

If the input merged polygon group and the output merged polygon group consist of the same polygons, the transaction is geometrically integral;

If the number, order, and content of the directional border lists of the two loops are the same, or after several operations of op.1 or op.2, the number, order, and content of the directional border lists of the two loops are the same, then the two loops are equivalent:

Op.1: Circularly rotate the list of directional borders of one of the loops;

Op.2: Replace a directional border with sub-borders in one of the loops;

Two polygons are identical if the loops of the two polygons correspond one-to-one by equivalence.

Further, the method for merging polygons specifically includes the following steps:

S11. Test whether polygon A and polygon B to be merged have common edges. If the test result is affirmative, obtain zigzag line segments composed of all common edges of polygon A and polygon B with endpoints as $(e_1, f_1), (e_2, f_2), \ldots, (e_w, f_w)$, wherein the line segments share no common endpoints;

S12. For each of the above line segments $(e_j, f_j)$, perform the following steps. After all are completed, all non-empty loops in A and B will form a merged polygon:

S121. If $e_j$ or $f_j$ is not an endpoint of the directional border that it is in, replace the directional border with sub-borders in the loop containing the directional border. Repeat it until $e_j$ and $f_j$ are both endpoints of a directed border in the loop;

S122. If the line segment $(e_j, f_j)$ appears in two different loops Q and R, merge the loops Q and R into a loop equivalent to W. The method to generate the loop W is as follows:

Rearrange loop Q and the loop R in their original circular orders, excluding the borders in the line segment $(e_j, f_j)$, to form two new directional border lists, such that the starting points of the first directional border and the ending points of the last directional border are endpoints of the line segment $(e_j, f)$ for both lists. Then concatenate the two lists of directional borders, the concatenated list of directional borders constitutes the new loop W;

S123. If the line segment $(e_j, f_j)$ appears twice in a loop W, split the loop W into two new loops named loop $W_1$ and loop $W_2$. The loops $W_1$ and $W_2$ are respectively composed of two groups of directional borders in the loop W that appear between the line segments $(e_j, f_j)$ according to the original circular order.

Further, the method for constructing elementary right set includes the following steps:

71) Merge the right sets in the input tokens and the right sets in the output tokens to form a set R1;

72) Based on step 73) and step 74), replace the rights in the set R1, until there are no rights with ancestor-descendant relationship in the set R1, then the set R1 is an elementary right set;

73) Test whether there is an ancestor-descendant pair of rights in the set R1;

74) If the test result is affirmative, obtain each right r in the parent-child relationship chain between the descendant and ancestor rights except for the ancestor and add the complement right of r to the set R1. Delete the ancestor right from the set R1;

Further, verifying the legitimacy of the transaction includes verifying the integrity of the transaction, the values of the tokens are monodromies, and the verification of the transaction integrity includes the following steps:

81) Incorporate monodromies in all input tokens and output tokens into a monodromy set;

82) For each monodromy in the monodromy set, find the matching input token and matching output token containing the monodromy. Add all the rights in right sets of the matching input tokens and matching output tokens to a input matching right group and a output matching right group respectively;

83) Complementarily merge the input matching right group and the output matching right group to form a merged input right group and a merged output right group respectively.

84) Test whether the merged input right group and the merged output right group are the same, if the test result is affirmative, the transaction is integral under the monodromy;

85) A transaction is integral if, for every monodromy in the monodromy set, the transaction is integral under the monodromy.

The present invention is implemented in this way, during the circulation process of the token in the blockchain system, constructs transaction per user; sends the transaction data to nodes in the blockchain. Construction of transaction includes splitting and merging of rights, and the method of rights splitting is as follows:

Divide the rights in the input token right set into two complementary subsets.

Construct two output tokens, the value of the two output tokens are the same as the value of the input token, and the right sets of the two output tokens are the two subsets respectively.

The method for right merging is as follows:

Merge the two input tokens with the same value to form an output token. The value of the output token is the same as the value of the input tokens, and the right set is the union of the two input token right sets;

The transaction contains tokens, and the token contains a value and a right set. The value is one of: a number, a geometric object, a monodromy. A monodromy may be the identity of a thing. The right set is a set of rights, which are indexes or handles referencing nodes in the right forest. The right forest consists of a collection of right trees. A right tree is a tree data structure. Each node in the right tree contains description of right scope. The child nodes of a node exist in pair, which is called sub-right node pair. The right scopes of a pair are complementary within the right scope of their parent node.

The present invention is implemented in this way, a block chain system, the system is composed of nodes and terminals, the nodes and the terminals are connected to the Internet and communicate with each other through the Internet.

Terminal constructs transaction based on the blockchain method described above per user, and sends the transaction data to the nodes in the blockchain system;

Node receives the transaction data sent by the terminal or the block data sent by other nodes, and the block comprises of packed transactions. The node verifies whether a received transaction or transactions in a block are legitimate. If the received block is legal, add the block to the end of the local blockchain data; if the received transaction is legal, keep the transaction, and periodically pack the received legal transactions into a block, adding the packed block to the end of the local blockchain data and broadcast it to other nodes in the blockchain network.

The present invention is implemented as a computer-readable storage medium on which a computer program is stored. When the computer program is executed by a processor, any of the blockchain methods described above is implemented.

A blockchain system consists of multiple blockchain nodes connected to the Internet. Each node can receive transaction information from network terminals and blocks from other nodes. After the node receives the transaction information, it verifies if the received transaction is legal, including verifying that the input of the transaction is an unused token in the blockchain and if transaction has proper authorization and is integral. The blockchain system only accepts verified transactions. The present invention suggests methods for generating and verifying transaction of tokens with rights.

The present invention suggests that the token can contain a set of rights. Right can be divided or merged. The present invention suggests methods of dividing and merging. Any right can be divided into two complementary rights, affirmative and negative, according to any definition, and vice versa, these two rights can also be merged into one right. Further, tokens can be split by rights, the right set in a token may be split into two disjoint subsets, thus a token is divided into two.

Further, the present invention also proposes that value of token can be more than just a number, it may be a geometric object or a monodromy. For different value types, the present invention proposes method for transaction verification, token splitting and merging. These methods together constitute a blockchain system, which can realize functions that cannot be provided by traditional blockchain systems, thus better meet the needs of users.

Taking land-related rights as an example, if the land is represented by polygons in the blockchain, a blockchain with traditional methods can only represent one kind of land rights, such as land ownership. However, through the method for splitting and merging right provided by the present invention, polygon with rights may be used to represent land rights, such as ownership, contracting rights, management rights, and production rights in order to meet the needs of land circulation better.

Take tokens with number values as an example. The traditional blockchain can only fully transfer the rights represented by the values, and cannot perform partial transfer. For example, if the values represent the membership of a movie theater, the traditional blockchain only allows the transfer of membership in entirety, and does not allow the transfer of part of the membership rights, such as the right to watch a certain movie. Through the method of splitting and merging equity provided by the present invention, the right to watch a certain movie can be transferred and the remaining rights retained.

Take a token containing monodromy and right set as another example. Monodromies are suitable for representing items that are unique in the real world, such as artworks. However, although the items are unique, but the rights attached to them are many. Artwork can be sold, pledged, rented, and more. By recording the circulation of rights of artworks on the blockchain, the artworks are better protected against forgery, and liquidity of artworks is also improved.

DETAILED DESCRIPTION

Many embodiments could be constructed according to the present invention. Embodiments of the present invention will be described clearly and in entirety in further detail below with reference to the attached figures. Obviously, the embodiments described are only some, but not all, embodiments of the present invention. Based on the embodiments or principles of the present invention, technicians may construct other embodiments according to the present invention without creative work, which are protected within the scope of the present invention.

Figure 1:
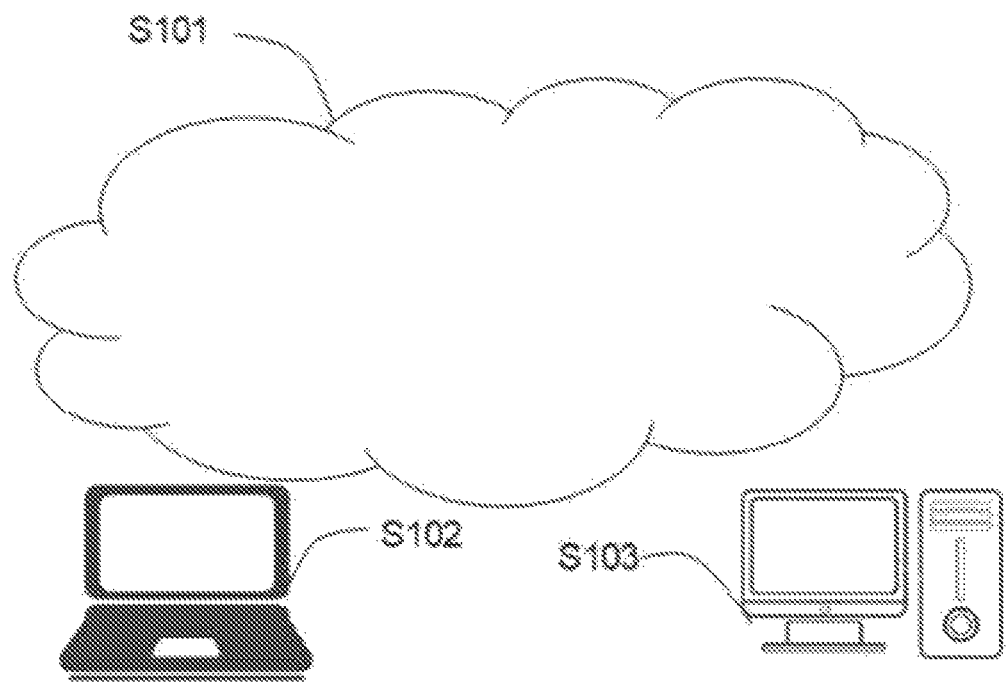
FIG. 1 illustrates a blockchain system according to an embodiment of the present invention.

FIG. 1 is a blockchain system consisting of one or more network terminals (S102) connected to the Internet (S101) and one or more blockchain nodes (S103) connected to the Internet (S101). The network terminals (S102) construct transactions according to the user input, and send the transaction to the blockchain nodes (S103) through the Internet (S101). Each blockchain node (S103) can receive transaction from the network terminals (S102) and blocks from other blockchain nodes (S103). A transaction consists of a group of inputs and a group of outputs. Each output of a transaction is a token. In some embodiments, each input of a transaction is a reference to another transaction's output token. In some other embodiments, each input to the transaction is also a token. After having received a transaction, the nodes (S103) test whether the received transaction is legal, including test that inputs of the transaction are unspent tokens in the blockchain; and whether the transaction has appropriate authorization and is integral. For embodiments that use the unspent transaction output (UTXO) accounting method, the unspent token is the output of a transaction that has not been referenced as input by any transaction. For embodiments that use account based bookkeeping method, unspent tokens are the tokens in the token provider's account. The nodes (S103) pack legal transactions received periodically to generate a block. Append the block to the tail of local blockchain data, and broadcast it to other nodes in the network (S103) through the Internet (S101). After having received a new block from other nodes (S103), nodes (S103) test whether all transactions in the received block are legal. If the test result is affirmative, the block is appended after the tail of the local blockchain data as the latest block of the blockchain.

The network terminals (S102) may be a computer, a mobile phone, or other smart devices, and the blockchain nodes (S103) may be a computer, a blockchain mining machine, or a server.

An embodiment of the present invention is a blockchain method, comprising the following steps:
S1. Receive transaction or block. The block is formed of packed transactions;
S2. Verify that the received transaction or the transactions in the block are legal.
S3. If the block is legal, append it after the tail of local blockchain data. If the received transaction is legal, keep the transaction and periodically pack the legal transactions into a block, append the block after the tail of the local blockchain data and broadcast it to other nodes in the blockchain network.

Blockchain nodes verify the legitimacy of transactions. A blockchain node includes a right database and a processor unit. The right database contains the definition of all rights in the blockchain in a tree data structure. The processor unit stores the right definition data into the right database, and verifies legitimacy of the transaction according to the information in the right database. Verification of the legitimacy of the transaction includes verifying integrity of the transaction.

A transaction consists of a group of inputs and a group of outputs. Inputs are references to tokens spendable in the blockchain (called input tokens), and outputs are new tokens produced by the transaction (called output tokens). Mainstream blockchain technologies use two types of bookkeeping systems. One is the UTXO method, such as what is used by Bitcoin. This method does not record the user's assets in a centralized record. Instead, users prove their ownership of assets by cryptographically unlocking a transaction output and spend the transaction output at the same time. The other method is an account based book-keeping method, such as what is used by Ethereum, which is similar to the traditional accounting method. In this method, in addition to transaction records, the blockchain also stores the mapping relationship from Ethereum addresses to assets. Each mapping relationship constitutes an account. The Ethereum address is the hash value of a public key, and the asset transferring party in the transaction proves ownership of the Ethereum address cryptographically, hence ownership of the assets under mapping. Once a legal transaction is accepted by the blockchain, the node updates the mapping by deducting the transferred assets from the sender's account and add it to the receiver's account. The present invention may be implemented using either accounting methods. If the UTXO accounting method is used in an embodiment, a spendable token is an unspent output of another transaction. If the account based book-keeping method is used, wherein an account is a mapping relationship from a blockchain address to a collection of tokens, a spendable token is a token in the collection. In a transaction, senders prove their ownership to the addresses referred in the inputs cryptographically. Once the transaction is accepted by the blockchain, the nodes delete input tokens from their collections and add tokens to collections of the respective output addresses. It is easier to implement the present invention using the UTXO accounting method than using account based method. Embodiments described here will be based on UTXO method. According to the description of an embodiment based on UTXO method, technicians in the field can construct an embodiment of the present invention using account based method without making any creative effort, which is also protected under the present invention.

Token contains the following data: (a) a value; (b) a right set comprising rights. We denote a token as [V, R], where V is the value of the token, and R is the right set. The value of the token can be one of the following three types:
 a) A number; for example, the number 5 represents 5 Bitcoins.
 b) A geometric object; for example, a polygon representing a piece of land; the geometric objects in the tokens are not limited to polygons, but can be polyhedrons, or any mathematically defined geometric object, such as spheres, curved surfaces, etc.
 c) A monodromy; monodromies may be the identifications of matters or things.

Monodromies can be of many kinds, characterized by uniqueness. They are indivisible nor combinable with other data during information processing. Monodromies can represent real or virtual objects, events, or people. A monodromy can be a hash value, name or codename of a real or virtual thing, (including people, events, objects, places, regions, projects, programs, organizations, groups, concepts, procedures, methods, processes, natural phenomena, etc., everything that can be named), an index value or a handle.

For example, the hash value of a scanned image of a painting, used to represent a painting, is a monodromy. Names of people and places can also be monodromy. An event name such as "2016 Olympics" can also be a monodromy. Virtual things, such as the "Starship Enterprise", can also be a monodromy.

Any right F can be split into two rights with respect to any description d affirmatively and negatively. The original right is called the parent right, and the split rights called child rights. The two child rights complement each other under the parent right. Denote the child right affirming description d within the right scope of F as F(d), and child right denying description d within the right scope of F as F(~d). Each of these two child rights is a complement to the other child right. That is, F(d) is the complement of F(~d) and F(~d) is the complement of F(d). The child rights F(d) and F(~d) so split can also be merged into their parent right F, i.e.: F=F(d)

∪ F(~d). A right is an ancestor (or descendant) of another right if a chain of parent-child rights exists between them.

Rights are represented by a triple (p, d, f), if its index is R, it can be denoted as R(p, d, f), or abbreviated as R. We can use the hash value of the triple as its index. In this triple, p is the parent item, which is the index of a right in the blockchain (nil when there is no parent right). d is the description item, which is any text of any length. Text includes human-readable text, or data that can be processed by a computer program. f is attribute of the right, which is a Boolean value.

If f is true, the scope of right R is the scope described by d within the scope of p. If f is false, the scope of right R is the scope denied by d within the scope of p.

Rights forms a tree data structure according to their parent-child relationship which is called a right tree, in which each right node represents a right, and the parent-child relationship of the right nodes in the tree represents the parent-child relationship of rights. The children of a node always appear in pair in a complementary relationship. The database for rights stores multiple right trees, and these right trees form a right forest. Each right in the right set of a token is an index or handle referencing a right node in the right forest.

If the right set of a token contains only one right, it is called a simple token.

In a right set or a right group, if a complementary relationship between two rights exists, the two complementary child rights can be replaced by their parent right in the right set or the right group. This operation is called complementary merging.

A token covers a right if the right itself or one of its ancestors is in the token's right set.

Take land rights as example. Assume there is a token [L,{P(nil, "land ownership", true)}] representing a piece of land, where L is a polygon representing shape of the land. When the land is let, the owner of the token [L,{P}] will split the token into two tokens, [L,{Q(P, "land lease right", true)}] and [L,{S(P, "land lease right", false)}]. The owner would transfer the former token to the tenant and keep the latter token. The tenant can further split the token into two tokens, [L,{T(Q,"land sublease right",true)}] and [L,{U(Q, "land sublease right",false)}] and transfer the former to the sub-tenant. Take another example of tokens containing numerical value and right. Assuming a cinema issues a token [5,{P}] (with value 5 and right set {P(nil, "membership", true)}), which represents 5 membership cards. Assuming that the cinema provides a membership privilege that members may watch movies free every Tuesday. The token owner can split the token into two tokens [5,{Q(P,"2019/11/5",true)}], and [5,{R(P, "2019/11/5", false)}]. The former token represents the right to watch free movies on Nov. 5, 2019. Token holders can further split the former token into 5 [1,{Q}] tokens and transfer them to 5 friends to watch the movie on May 11, 2019. As for the latter token, the owner can continue to split into two tokens [5,{S(R,"2019/11/12", true)}], and [5,{T(R,"2019/11/12", false))}], etc. In so doing, the owner can perform a right split every Tuesday and invite 5 people to watch the movie.

Another example is about tokens that contain monodromies and rights. Assuming a museum has a token [D,{P(nil, "ownership",true)}] that represents a painting, where D is the hash value of a digitally scanned image of a painting. If the museum plans to rent the painting to another museum for exhibition in December 2019, the first museum can split the token into [D, {S(P, "right to exhibit in December 2019", true)}] and [D,{T(P,"right to exhibit in December 2019", false)}]. The former token is transferred to the second museum evidencing an exhibition contract. The latter token is reserved by first museum and can be further split for exhibition rights in other time periods.

The blockchain nodes verify legitimacy of transactions, which includes verifying integrity of transactions. Transactions are legal only if they are integral. Integrity refers to the characteristics that the group of inputs and the group of outputs are the same in property and quantity. What amounts to "the same" depends on the types of tokens. Legitimacy verification also includes the conventional verification of ownership by cryptographic method, but this does not belong to the scope of the present invention.

The program for verifying integrity of transactions can be part of the blockchain kernel program, or it can be included in a smart contract deployed on the blockchain and when the blockchain kernel program executes the smart contract, the transaction is verified. No matter which method is adopted, they are all within the scope of the present invention.

An embodiment of the present invention is a method for verifying integrity of transactions with numerical tokens, the method is as follows:

a) Split tokens in transactions into simple tokens. The method to split is that, for each right in the right set of each input token and output token, construct a simple token respectively. The simple token has a right set containing only that right and value component identical to the original token. Place the simple tokens split from the input tokens in the simple group of input tokens. Place the simple tokens split from the output tokens in the simple group of output tokens.

b) If there are two tokens in the simple group of input tokens or in the simple group of output tokens with identical values and their rights are complementary under one parent right, the two tokens will be merged in their respective group into a simple token with value identical to values of the original tokens and a right set containing the parent right only.

c) If there are two tokens in the simple group of input tokens or in the simple group of output tokens whose values are different and the rights are complementary under one parent right, replace in their respective group the two tokens with a token whose value is identical to the lesser of the two values of the two tokens and whose right set contains only the parent right, and a token whose value is the difference of the two values of the two tokens and whose right set is identical to that of the token with greater value.

d) If there are two tokens with identical right sets in the simple group of input tokens or in the simple group of output tokens, replace in their respective group the two tokens with a token having a value equal to the sum of the values of the two tokens and a right set identical to that of the two tokens.

e) If, after none or some applications of the above operations, the simple group of input tokens and the simple group of output tokens are identical, the transaction is integral.

Figure 2:
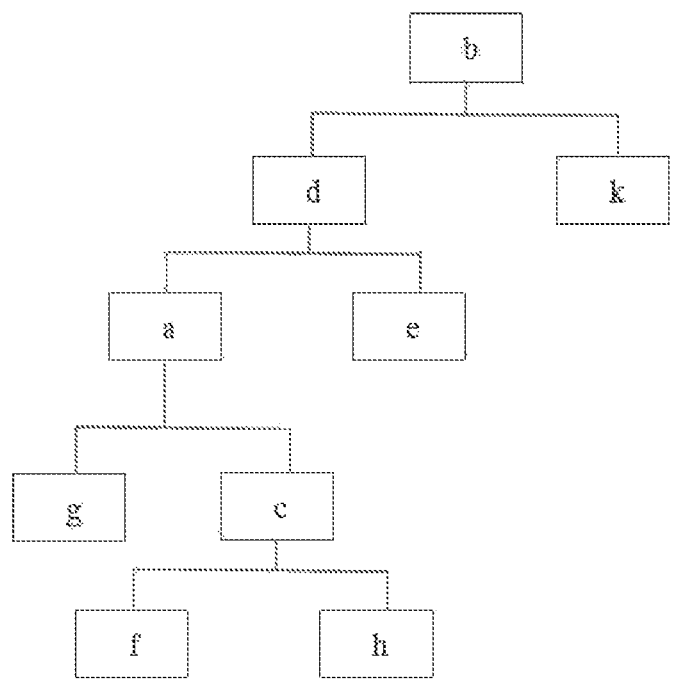
FIG. 2 illustrates relationship among rights according to an embodiment of the present invention.

Take an example to illustrate verification of integrity of a transaction using the method described above. Assuming that input tokens of the transaction are A=[5, {a, b, c, d}], B=[7, {a, e, f, g}], output tokens are C=[5,{a, d, f}], D=[5,{g, k, h}], E=[7, {a, f, g}], F=[5,{c, e}], G=[7,{e}]. As shown in FIG. 2, a=c∪g, b=d∪k, c=f∪h, d=e∪a.

For the input tokens, first split the tokens into simple tokens according to step a), the result is: [5,a], [5,b], [5,c], [5,d], [7,a], [7,e], [7,f], [7,g]. Then merge according to step d), the result is: [12, a], [5, b], [5, c], [5, d], [7, e], [7, f], [7, g]. Then merge according to step c), the result is: [5, a], [5, b], [5, a], [2, g], [5, d], [7, d], [7, f]. Then merge according to step d), the result is: [10, a], [5, b], [2, g], [12, d], [7, f].

For the output tokens, first split the tokens into simple tokens according to step a), the result is: [5,a], [5,d], [5,f], [5,g], [5,k], [5,h], [7,a], [7,f], [7,g], [5, c], [5, e], [7, e]. Then merge according to step b), the result is: [5,d], [5,b], [5,c], [5,a], [7,a], [7,f], [7,g], [7,e]. Then merge according to step d), the result is: [5,d], [5,b], [5,c], [12,a], [7,f], [7,g], [7,e]. Then merge according to step c), the result is: [5,d], [5,b], [5,a], [5,a], [7,f], [2,g], [7,d]. Then merge according to step d), the result is: [12, d], [5, b], [10, a], [7, f], [2, g]. According to step e) the final result of the simple group of output tokens is the same as the simple group of input tokens, and the transaction is integral.

One embodiment of the present invention is a method for verification of integrity of transactions with tokens containing geometric objects, including the following steps:

11) Construct an elementary right set for the transaction;
12) For each right in the elementary right set (an elementary right), find the matching input tokens and the matching output tokens covering the right respectively and construct a group of matching input geometric objects and a group of matching output geometric objects to include geometric objects in the matching tokens respectively. Optionally, geometric objects in a group may be merged before the next step in order to reduce complexity of testing. Test whether the two group of geometric objects are geometrically integral. If the test result is affirmative, the transaction is integral under the elementary right;
13) A transaction is integral if it is integral under all the elementary rights.

A token covers a right if the right is in the right set of the token or is a descendant of a right in the right set.

Elementary right set is a set of rights, wherein no right is an ancestor of another right and any right in the rights sets of input tokens or in the right sets of output tokens is either in the elementary right set or can be formed by merging some rights in the elementary right set complementarily.

If a group of input geometric objects and a group of output geometric objects are the same, the group of input geometric objects and the group of output geometric objects are geometrically integral.

A group of input geometric objects and a group of output geometric objects are the same only if the group of input geometric objects and the group of output geometric objects satisfy conditions 1 and 2. The conditions 1 and 2 are as follows:

Condition 1: There is no spatial overlap among the geometric objects of the group of output geometric objects;
Condition 2: The space occupied by all the geometric objects of the group of input geometric objects is the same as the space occupied by all the geometric objects of the group of output geometric objects.

Figure 3:
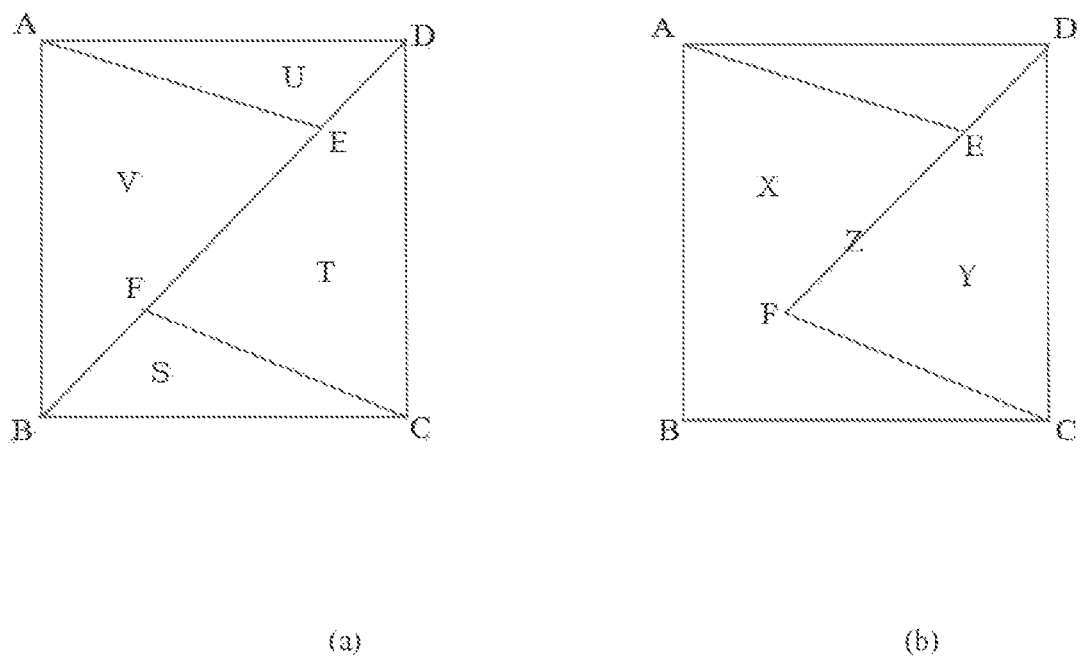
FIG. 3 illustrates a transaction involving polygon tokens with right according to an embodiment of the present invention, wherein (a) showing geometric shapes of the input polygons, and (b) showing geometric shapes of the output polygons.

FIG. 3 is an example of verifying integrity of transactions involving geometric objects. The relationship among rights a-g is the same as shown in FIG. 2. The input polygons are U(△AED), V(△BEA), S(△BCF), T(△CDF). The output polygons are X(△BCFE), Y(△CDF), Z(☐ABCD). Their right sets are U{f, c}, V{d, c}, S {d, c}, T{b, c}, X{g}, Y{g, e}, Z{f, c} respectively. In this example, the set of all the rights in inputs and outputs is G={f, c, d, b, g, e}, the elementary right set is R={f, c, g, e}. For rights f and c, the input and output polygon groups of the tokens whose the right set covers f are {U,V,S,T} and {Z} respectively. The merged input polygons is ☐ABCD, which is the same as Z, therefore the input and output polygon groups are geometrically integral under f and c. For right g, the input and output polygon groups of the tokens whose the right set covers g are {V,S,T} and {X,Y} respectively. The merged input polygons is ABCDE, and the merged output polygons is also ABCDE, thus they are geometrically integral. For right e, the input and output polygon groups of the tokens whose the right set covers e are {T} and {Y} respectively, which are both △ CDF. Therefore the input and output polygon groups are geometrically integral under e. Thus for each elementary right, the input and output polygon groups are geometrically integral under the elementary right, therefore, the transaction is geometrically integral.

Polygons are a type of geometric objects. One embodiment of the present invention is a method for verification of geometric integrity of an input geometry group and an output geometry group for a transaction in which the values in the tokens are polygons.

First, the local device stores a border forest; the border forest is a collection of border trees; a border tree is a tree data structure. There is a tree-like hierarchy among borders. In geometrical meaning, border is either a polygon edge or formed by plural contiguous edges. Edges in a border may belong to one polygon and may belong to different polygons. In data structural meaning, a border represents a node in border tree. Nodes store the substance data of border and information relating to structure of the tree. Generally, borders are references such as indices or pointers referencing nodes in border trees, usually as hash values of node data. Geometrically, a node represents a zigzag line formed by contiguous edges between two vertices (they don't have be adjacent, and may belong to different loops or polygons). These two vertices are called the starting point and the ending point, collectively called as the endpoints. When a node has no child node, it represents the line segment connecting its two endpoints, which is an edge in a polygon. When a node has child nodes, the node represents the zigzag line formed by all the edges represented by all the leaf nodes in the sub-tree of the border tree rooted at the node. In an embodiment, the node data includes the vertex indices of the starting and ending points of the border and the indices of its parent nodes (nil if there is no parent node). We represent these information as a triple (a, b, f), wherein a is the index of the starting point, b is the index of the ending point, and f is the index of the parent node. A node index is a value that uniquely represents a node, and the hash value of its content can be used as the index. The index of a vertex is a value that uniquely represents a vertex, and the hash value of the coordinates of the vertex can be used as the index of the vertex.

A polygon is represented by a group of loops. A loop is an ordered list of directional borders. A directional border contains a border and its direction information. Border is index or handle of a node in the border forest. The border forest is a collection of border trees; a border tree is a tree data structure. A leaf node of border tree represents a polygon edge. A node in border tee represents a zigzag line formed by all edges represented by leaf nodes in the sub-tree of border tree rooted at the node.

In an embodiment of the present invention, for a directional border containing border d, if the direction from the starting point toward the ending point of the border d is consistent with the orientation of the loop that the directional border is in, its direction information f is true, otherwise its direction information f is false. Therefore, if f is true, the starting and ending points of a border are the starting and ending points of the directional border, respectively. If f is false, the starting point of the border line is the ending point of the directional border, and the ending point of border is the starting point of the directional border. The list of directional borders of a loop is an ordered list, and the order of the directional borders in the list is consistent with the orientation when walking along the loop. If the directional borders in the loop are rearranged in circularly, it remains the same loop geometrically, and we call the two directional border lists circularly equivalent.

A border is equivalent to the zigzag line segment composed of all its sub-borders. For a directional border in a loop, the resulting loop is also equivalent to the original loop if replacement is made according to the following rules:

If a directional border A of a loop contains border PQ whose sub-borders are $PW_1, W_1W_2, \ldots, W_{n-1}W_n, W_nQ$ and its direction information is F, replace A in the loop according to the rules below: if F is true, with a list of ordered directional borders $PW_1, W_1W_2, \ldots, W_{n-1}W_n, W_nQ$ with their direction flags set to true; if F is false, with a list of ordered directional borders $W_nQ, W_{n-1}W_n, \ldots, W_1W_2, PW_1$ with their direction flags set to false.

An operation according to the rules above is called replacing directional border with sub-borders.

Two loops are equivalent if they can be made circularly equivalent by repeatedly replacing directional border with sub-borders. The equivalence of loops can also be expressed more formally as:

After some operations of Op.1 or Op.2 (including no operation), if the quantity, order, and content of the directional borders of the two loops are the same, the two loops are equivalent:
  Op.1: Rotate the list of directional borders of one of the loops circularly;
  Op.2: Replace a directional border with sub-borders in one of the loops.

Two polygons are the same if they actually occupy the same space, no matter what data structure are used to represent them. Therefore, two polygons are the same if their loops correspond one-to-one by equivalence.

For polygons represented according to the method described above, a method for verifying geometric integrity of a group of input geometric objects and a group of output geometry geometric objects includes:
  Merge polygons in the group of input geometric objects and polygons in the group of output geometric objects respectively to form a group of merged input polygons and a group of merged output polygons;
  If the group of merged input polygons and the group of merged output polygons consist of the same polygons, the transaction is geometrically integral.

Figure 4:
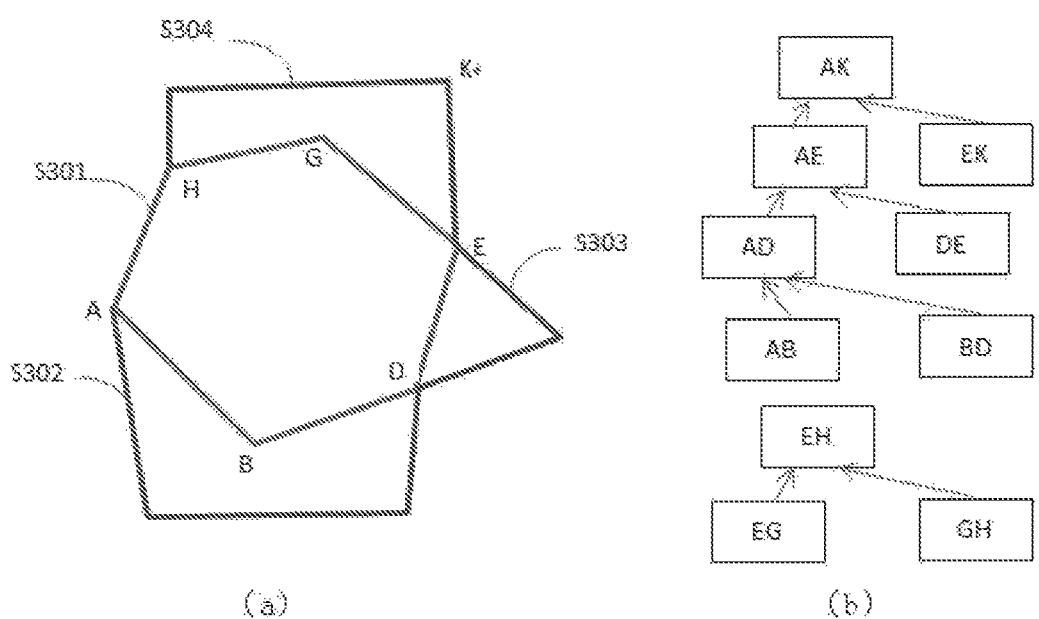
FIG. 4 illustrates data structure of geometric objects according to an embodiment of the present invention, wherein FIG. (a) is a diagram of geometric objects, and FIG. (b) is a tree data structure for storing data of the geometric objects in FIG. (a).

FIG. 4(a) is an example with 4 polygons (S301, S302, S303, S304). FIG. 4(b) illustrates the structure of border trees according relationships among some of the borders in FIG. 4(a). The arrows in FIG. 4(b) represent the parent-child relationship among borders. A box represents a border. The first letters are the starting points of respective borders. The second letters are the ending points of respective borders. Polygon S301 consists of one loop. The loop contains three borders AE, EH, HA. Border AE is a sub-border of border AK and also the parent border of borders AD and DE. Border AD is the parent border of AB and BD. When the direction of a border is inconsistent with the orientation of the loop, the direction information associated with the border in the loop is false, and we express it by adding a "–" sign before the border. Thus, polygon S302 has only one loop and there is a border "–AD" in the loop. The polygon S303 has only one loop and there is a border "–DE" in the loop. The polygon S304 has one loop and there is a border "–EH" in the loop. Among the four loops, data of borders AD, DE, EH are shared between two polygons.

One embodiment of the present invention is a method for merging polygons. Polygons in the blockchain are represented according to the method described above. Merging polygon A and polygon B comprises of the following steps:
  S11. Find the zigzag line segments $O_1, O_2, \ldots O_n$ that consist of and only of all common edges between A and B wherein no two segments having a common endpoint. If there is no such segment, polygon A and polygon B cannot be merged.
  S12. Add all loops of polygons A and B to a set of loops named L.
  S13. For each segment $O_j$ where $(e_j, f_j)$ are the endpoints of the segment $O_j$, perform the following steps:
    S131. If either $e_j$ or $f_j$ is not an endpoint of the directional border that it is in, replace the directional border with sub-borders in the loop containing the directional border. Repeat this step until $e_j$ and $f_j$ are both endpoints of some directional borders in the loop;
    S132. If $O_j$ appears in two loops Q and R of L, merge them into one loop in L. The method of merging comprises of replacing Q and R in L with a new loop which is obtained by removing the borders in $O_j$ from the directional border lists of Q and R, rearranging their directional borders in their original circular order so that the starting points of their first directional borders and the ending points of their last directional borders are the endpoints of $O_j$ then concatenate the two lists of directional borders to form a new loop.
    S133. If $O_j$ appears twice in a loop Q of L, split Q into two new loops $W_1$ and $W_2$ in L. $W_1$ and $W_2$ comprise of the directional borders appearing between the two appearances of $O_j$ in Q in their original circular order respectively. In other words, the two new loops are formed as follows: begin with $O_j$ traverse all the directional borders of Q in circular order, add the directional borders visited after the first occurrence of $O_j$ and before the second occurrence of $O_j$ into one loop; add the directional borders visited after the second occurrence of $O_j$ and before the next occurrence of $O_j$ into another loop.
    S134. After all common borders are processed according to the steps above, the non-empty loops remaining in L constitute the merged polygon.

The above method of merging polygons is not the only polygon merging method, one can rotate the directional borders in the loop circularly, or replace a parent directional border with sub-borders, or merge some directional borders in the loop into the parent directional border, resulting in a loop different from but equivalent to that produced by the above method. Any merge method that generates polygons equivalent to those generated by the method above are protected under the present invention.

Figure 5:
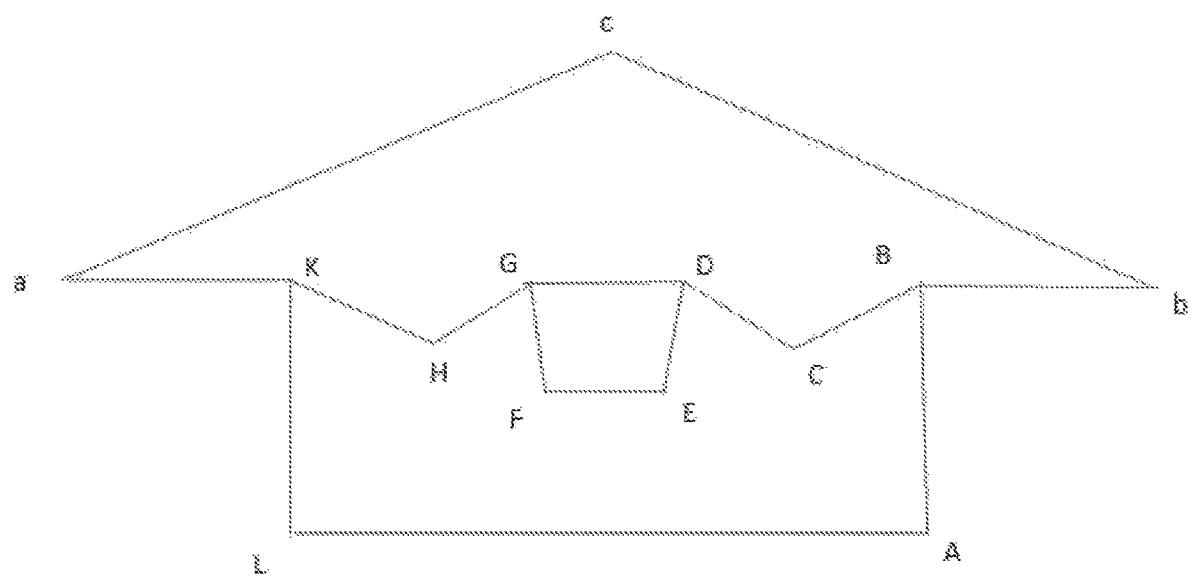
FIG. 5 illustrates geometric objects to be merged in a merging operation according to an embodiment of the present invention.
Figure 6:
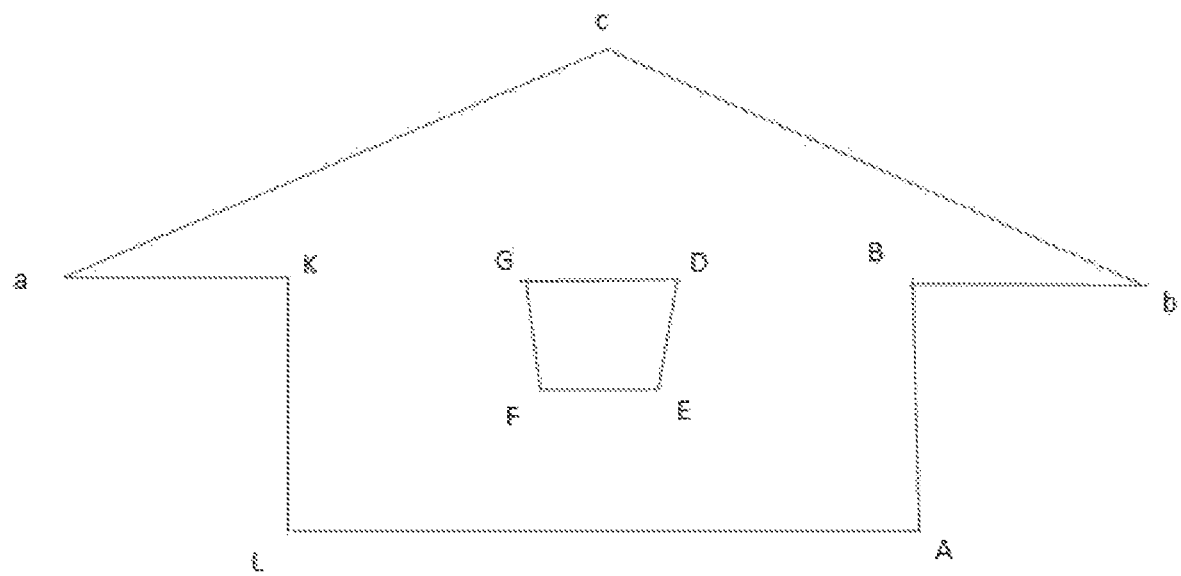
FIG. 6 illustrates geometric objects after being merged in first merging operation according to an embodiment of the present invention.

FIGS. 5 and 6 illustrate merging polygons according to the method above. P (lower part in FIG. 5) and Q (upper part in FIG. 5) are polygons in FIG. 5 to be merged. They have two common line segments, BCD and GHK. Since both P and Q have only one loop, we also refer to the corresponding loops by P and Q. The directional borders in the P loop are: AF, FH, HL, LA. The directional borders in the Q loop are: aK, –HK, –HG, GD, –DC, –CB, Bb, bc, ca. The sub-borders of AF are: AB, BC, CD, DE, EF. The sub-borders of FH are: FG, GH. The sub-borders of HL are: HK, KL.

1) First, process the contiguous line segment BCD. Because B and D are not the endpoints of borders in P and Q, according to step S131, replace directional borders in P and Q with sub-borders. The directional borders of the loop P after the replacement are: AB, BC, CD, DE, EF, FG, GH, HK, KL, LA.

Because the segment BCD appears in both the loops P and Q, they are combined into one loop according to step S132, the method is: delete the BCD from loop Q and rearrange the directional borders with D as the starting point, namely: DE, EF, FG, GH, HK, KL, LA, AB. Deleting BCD from loop P, rearrange the directional borders with B as the starting point, namely: Bb, bc, ca, aK, -HK, -GH, GD. Concatenate the two list and the result is: DE, EF, FG, GH, HK, KL, LA, AB, Bb, bc, ca, aK, -HK, -GH, GD.

2) Then process the line segment GHK. Because GHK appears twice in the above-mentioned merged loop, the loop is split into two loops according to step S133, one loop comprises of the directional borders from GD to FG circularly, namely: GD, DE, EF, FG. The other loop comprises of the directional borders from KL to aK circularly, namely: KL, LA, AB, Bb, bc, ca, aK. The merged polygon consists of these two loops, as shown in FIG. 6.

Figure 7:
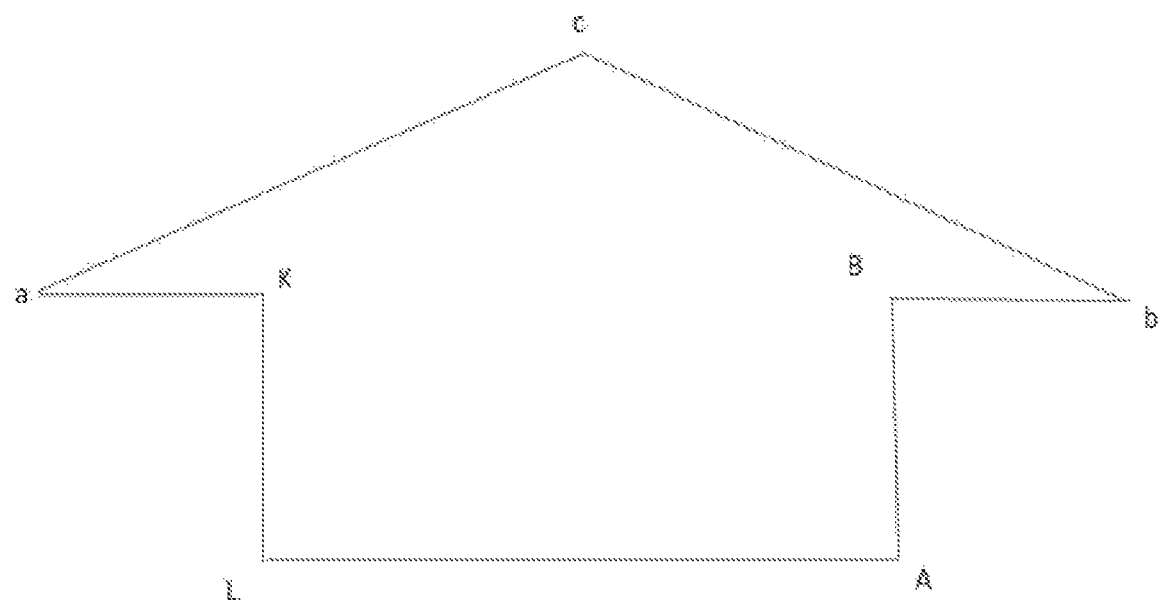
FIG. 7 illustrates geometric objects after being merged in second merging operation according to an embodiment of the present invention.

FIGS. 6 and 7 are another illustration of polygon merging. Merge the result polygon of the merging operation above with another single-loop polygon S. The directional borders of S are -FG, -EF, -DE, -GD. That is, S comprises of the same borders as one loop in the above merged polygon, but in the opposite direction. The common line segments of these two polygons are GD, DE, EF, and FG. According to S132, loops GD, DE, EF, FG and -FG, -EF, -DE, -GD need to be merged. The merging method is to first remove the segment from loop S and loops GD, DE, EF, FG. Since both loops are empty after deletion, no new loops need to be added. The result of the merging is a polygon with a single loop, which is: KL, LA, AB, Bb, bc, ca, aK, as shown in FIG. 7.

Another embodiment of the present invention is a method for verification of integrity of a transaction under an elementary right when token values are polygons. The method comprises of constructing an input border group and an output border group that comprise of all directional borders of all input polygons covering an elementary right and all directional borders of all output polygons covering the elementary right respectively; and verifying that the input border group and the output border group are identical or are identical after applications of any of Op. 3~5 one or more times:

Op.3: Replace a directional border in the input border group or in the output border group with sub-borders;

Op.4: Merge a sub-group of directional borders in the input border group or in the output border group that consists of all sub-borders of a border with a directional border having the border and direction information consistent with the directional borders in the sub-group;

Op.5: Remove two directional borders from the input border group or the output border group if they have opposite direction information and same border component.

Table 1 is an example of polygon groups shown FIGS. 5 and 7. All the polygons cover the same elementary right:

TABLE 1

Input and out polygon groups covering an elementary right

| Polygon | Input Directional Borders | Output Directional Borders |
|---|---|---|
| P | AF, FH, HL, LA | KL, LA, AB, |
| Q | aK, -HK, -HG, GD, -DC, -CB, Bb, bc, ca | Bb, bc, ca, aK |
| S | -FG, -EF, -DE, -GD | |

The group of directional borders of all input polygons (input border group) is: {AF, FH, HL, LA, aK, -HK, -HG, GD, -DC, -CB, Bb, bc, ca, -FG, -EF, -DE, -GD}. The group of directional borders of all output polygons (output border group) is: {KL, LA, AB, Bb, bc, ca, aK}. To help focus on the difference of the two groups, we remove the common directional borders of the two groups and have:

Input border group: {AF, FH, HL, -HK, -HG, GD, -DC, -CB, -FG, -EF, -DE, -GD}

Output border group: {KL, AB}

Applying Op. 5 to the input border group, GD and -GD are removed from the input border group, the input border group becomes: {AF, FH, HL, -HK, -HG, -DC, -CB, -FG, -EF, -DE}.

Applying Op. 3 to AF of the input border group, and then Op. 5, the input border group becomes: {AB, FH, HL, -HK, -HG, -FG}.

Applying Op. 4 to -HG, -FG of the input border group, the input border group becomes: {AB, FH, HL, -HK, -FH}.

Applying Op. 5 to the input border group, the input border group becomes: {AB, HL, -HK}.

Applying Op. 3 to HL of the input border group, and then Op. 5, the input border group becomes: {AB, KL}, which is identical to the output border group. Thus the transaction is geometrically integral under the elementary right.

One embodiment of the present invention is a method for constructing an elementary right set, comprising the following steps:

a) Merge right sets in all inputs and outputs of a transaction to produce a union right set R;

b) Test whether there us a right in R that is ancestor of another right in R. If the test result is affirmative, for each right item r on the parent-child chain from the descendant (inclusive) to the ancestor (exclusive), add the complement of r into R. Remove the ancestor right from R.

c) Repeat above step until there is no pair of rights in R having ancestor-descendant relationship, then the set R is the elementary right set of the transaction.

A right set covers a right if the right is in the right set, or an ancestor of the right is in the right set.

A right is covered by a token if it is covered by the token's right set.

One embodiment of the present invention is a method for verifying integrity of a transaction with tokens whose values are monodromies, including the following steps:

31) Add monodromies in all input tokens and output tokens into a set of monodromies.

32) For each monodromy in the set of monodromies, find the matching input tokens and matching output tokens covering the monodromy respectively. Add all the rights in the right set of matching input tokens and matching output tokens to the matching input right group and the matching output right group respectively.

33) Complementarily merge the matching input right group and the matching output right group respectively to form an merged input right group and an merged output right group.
34) Test whether the merged input right group and the merged output right group are identical. If the test result is affirmative, the transaction is integral under the monodromy.
35) If for every monodromy in the set of monodromies, the transaction is integral under the monodromy, the transaction is integral.

Illustrate the method by an example below. Providing A and B are monodromies. a-h are rights, and their relationships are shown in FIG. 2. Input of the transaction is [A,{g}], [A,{f,h}], [B,{d}], and output is [A,{a}], [B,{c,g}], [B,{f,h}].

According to step 31), the monodromy set is {A, B}.

First, take A as the monodromy of choice, and the matching input right group is [g, f, h] and the matching output right group is [a] according to step 32). Complementarily merge the groups according to step 33) to form input merged right group [a] and a output merged right group [a]. According to step 34) the transaction isintegral under A.

Then take B as the monodromy of choice, and the matching input right group is [d] and the matching output right group is [c, g, f, h] according to step 32. Complementarily merge the groups according to step 33) to form input merged right group [d] and a output merged right group [d]. According to step 34) the transaction is integral under B.

Finally, according to step 35), the transaction is integral.

One embodiment of the present invention is a method for constructing transactions in a blockchain. During the circulation of tokens in a blockchain system, construct transactions per user and send data of transaction to nodes in the blockchain system. Transactions contain tokens, and each token contains a value and a right set. The value may be a number, a geometric object or a monodromy. Monodromies may be the identities of things. Right set is a set of rights, which are references such as indexes or handles to nodes in right forest. Right forest consists of a collection of right trees. A right tree is a tree data structure. A node of a right tree contains a description for right scope. Child nodes of a node always exist in pair, which is called child node pair. The right scopes of a child node pair are complementary each other within the right scope of their parent node. Construction of transaction includes splitting and merging of rights. The method for splitting right is as follows:

Split the right items in the right set of an input token into two complementary sub sets;

Construct two output tokens, whose values are identical to that in the input token, and their right sets are the respective subsets above.

The method for merging rights is as follows:

Providing two input tokens with identical value, construct an output token with value identical to that of the input tokens and right set being the union of the right sets of the two input tokens.

An embodiment of the present invention is a block chain system comprising of nodes and terminals. The nodes and the terminals are connected to the Internet and communicate with each other through the Internet.

A terminal constructs transaction according to the methods described above per users, and transmits the transaction to nodes in the blockchain system.

A node receives the transaction sent by the terminal or block sent by other nodes, wherein the block is formed by packing transactions. The node verifies whether the received transaction or transactions in the block are legitimate. If the received block is legal, add the block to the tail of the local blockchain data; if the received transaction is legal, keep the transaction, and periodically pack the received legal transactions into block, adding the packed block to the tail of the local blockchain data and broadcast it to other nodes in the blockchain network.

An embodiment of the present invention is a computer-readable storage medium in which a computer program is stored. When the computer program is executed by a processor, any of the blockchain methods described above is implemented.

As should be appreciated by technicians in the field, the embodiments described in the present application may be provided as a method, a system, or a computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media (including but not limited to disk storage, CD-ROM, optical storage, etc.) having computer-usable program code embodied therein.

The present invention is described in terms of steps of methods, apparatus (systems), and computer program products according to embodiments of the present application. It shall be construed that each step can be implemented by computer program instructions. These computer program instructions may be provided for a general purpose computer, special purpose computer, embedded processor or other programmable data processing device to produce a machine for implementing the functions specified in one or more steps by execution of a processor of a computer or other programmable data processing device.

These computer program instructions may also be loaded into a computer or other programmable data processing device, allowing a series of operational steps to be performed on the computer or the programmable device to produce a computer-implemented process for implementation of the functions specified in one or more steps described above.

Finally, it should be noted that the embodiments described above are only used to illustrate the technical solutions of the present invention instead of limiting them. Although the detailed description of the present invention is described with reference to the above embodiments, technicians of the field should understand that the specific embodiments of the present invention can still be modified or equivalently replaced within the scope of the present invention and they shall fall within the scope of the claims of the present invention.

What is claimed is:
1. A blockchain method, comprising:
S1. receiving information of a transaction or information of a first block, said information of said first block comprises of packed information of transactions;
S2. verifying whether said transaction or each of the transactions in said first block is legal; and
S3. under the circumstance that said first block is legal, appending said first block after a tail of data of a local blockchain; under the circumstance that said transaction is legal, keeping said transaction, periodically packing received legal transactions into a second block, appending said second block after the tail of data of said local blockchain and broadcasting information of said second block to other nodes in a blockchain network;

wherein said transaction or each of the transactions in said first block comprises of tokens, and each of said tokens comprises of a value and a right set; said right set is a set of rights; each of said rights is a reference to a node in a right forest;

said value is one of: a geometric object and a monodromy;

said right forest comprises of a collection of right trees; each of said right trees is a tree data structure; each node of each of said right trees comprises of a description of scope of rights;

a node of each of said right trees may have a pair of child nodes, called child node pair, wherein scopes of rights of said child nodes supplement each other within a scope of said node.

2. The method of claim 1, wherein values of said tokens are geometric objects, the step verifying that a transaction is legal comprising a step for verifying that said transaction is integral, the method for verifying that said transaction is integral further comprising:

31) constructing an elementary right set for said transaction;

32) for each right in said elementary right set, finding matching input tokens and matching output tokens covering said right to construct a group of matching input geometric objects and a group of matching output geometric objects respectively; testing whether said group of matching input geometric objects and said group of matching output geometric objects are geometrically integral; when a result of said test is affirmative, said transaction is integral under said right;

33) when said transaction is geometrically integral under every right in said elementary right set, said transaction is integral;

said elementary right set is a set of the rights wherein no right in said elementary right set is an ancestor of another right in said elementary right set and any right in right sets of input tokens of said transaction or in right sets of output tokens of said transaction is either in said elementary right set or can be formed by complementarily merging rights in said elementary right set;

said group of matching input geometric objects comprises of geometric objects in said matching input tokens;

said group of matching output geometric objects comprises of geometric objects in said matching output tokens.

3. The method of claim 2, wherein said group of matching input geometric objects and said group of matching output geometric objects are geometrically integral when said group of matching input geometric objects and said group of matching output geometric objects satisfy conditions 1 and 2; conditions 1 and 2 are as follows:

condition 1: there is no spatial overlap among geometry objects in said group of matching output geometric objects; and condition 2: total space occupied by all geometry objects in said group of matching input geometric objects is the same as total space occupied by all geometry objects in said group of matching output geometric objects.

4. The method of claim 2, wherein geometric objects in said transactions are polygons, and each of said polygons comprises of a group of loops, and each of said loops comprises of an ordered list of directional borders, and each of said directional borders comprises of a border and direction information; a border forest is a collection of border trees; each of said border trees is a tree data structure; said border is an index or a pointer referencing a node in said border forest; each node in each of said border trees represents a zigzag segment of lines formed by all edges represented by all leaf nodes in a sub-tree rooted at said node.

5. The method of claim 4, further comprising:

merging all polygons in said group of matching input geometric objects and all polygons in said group of matching output geometric objects respectively to form a group of merged input polygons and a group of merged output polygons; and under the circumstance that said group of merged input polygons and said group of merged output polygons consist of same polygons, said group of matching input geometric objects and said group of matching output geometric objects are geometrically integral;

when quantities, orders, and contents of lists of directional borders of two loops are identical, or after at least one application of Op.1 and Op.2, the quantities, orders, and contents of the lists of directional borders of the two loops are identical, the two loops are equivalent:

Op.1: circularly rotating a list of directional borders of one of the two loops; and Op.2: replacing a directional border in one of the two loops with sub-borders;

two polygons are the same if loops in said two polygons correspond one-to-one by equivalence.

6. The method of to claim 5, the step for merging polygons further comprising:

S11. testing whether two polygons A and B to be merged have common edges; when a result of said test is affirmative, obtaining zigzag line segments composed of all common edges between said polygons A and B, providing endpoints of said zigzag line segments are $(e_1, f_1), (e_2, f_2), \ldots, (e_w, f_w)$ respectively, wherein said zigzag line segments share no common endpoints;

S12. for each of said zigzag line segments $(e_j, f_j)$, performing following steps; a merged polygon consists of all non-empty loops remaining in said polygons A and B after all of said steps are completed:

S121. when said endpoint $e_j$ or $f_j$ is not an endpoint of a directional border that said endpoint is on, replacing said directional border with sub-borders in a loop containing said directional border repeatedly until each of said endpoint $e_j$ and $f_j$ is an endpoint of a directional border in said loop;

S122. when said zigzag line segment $(e_j, f_j)$ appears in two different loops Q and R, merging said loops Q and R into a loop equivalent to a loop W, the method to generate said loop W comprising:

rearranging all directional borders of said loop Q and said loop R respectively in their original circular orders except for directional borders in said zigzag line segment $(e_j, f_j)$ to form two new lists of directional borders, such that for each of said two new lists a starting point of first directional border and an ending point of last direction border are endpoints of said zigzag line segment $(e_j, f_j)$; concatenating said two new lists of directional borders to form a concatenated list, said new loop W consists of said concatenated list of directional borders; and S123. when said zigzag line segment $(e_j, f_j)$ appears twice in a loop W, splitting said loop W into two new loops equivalent to loops $W_1$ and $W_2$, wherein said loop $W_1$ and said loop $W_2$ respectively comprise of directional borders of said loop W in their original cyclic order between said appearances of said zigzag line segment ($e_j$, $f_j$).

7. The method of claim 4, the method further comprising:
verifying that an input border group comprising all directional borders of all polygons in said group of matching input geometric objects and an output border group comprising all directional borders of all polygons in said group of matching output geometric objects are identical or are identical after applying any of Op.3, 4 and 5 one or more times:

Op.3: replacing a directional border in said input border group or in said output border group with sub-borders;

Op.4: merging a plural number of directional borders in said input border groups or in said output border group that consist of all child borders of a border into a directional border comprising said border and direction information consistent with the directions of said plural number of directional borders; and Op.5: removing two directional borders from said input border groups or from said output border group when they have opposite direction information and same border.

8. The method of claim 2, the step to construct said elementary right set further comprising:
71) merging right sets in input tokens of said transaction and right sets in output tokens of said transaction to form a set;
72) testing whether there is a first right in said set that is ancestor of a second right in said set; and
73) when a result of said test is affirmative, adding to said set every complement right of a right in a parent-child relationship chain between said second right, inclusive, and said first right, exclusive; removing said first right from said set.

9. The method of claim 1, wherein values of said tokens are monodromies, the step verifying that said transaction is legal comprising a step for verifying that said transaction is integral, the method for verifying that said transaction is integral further comprising:
81) adding monodromies in all input tokens of said transaction and all output tokens of said transaction to a set of monodromies;
82) for each monodromyin said set of monodromies, finding input tokens and output tokens containing said monodromy respectively; adding all rights in said input tokens and in said output tokens to an input matching right group and an output matching right group respectively;
83) complementarily merging said input matching right group and said output matching right group respectively to form a merged input right group and a merged output right group;
84) testing whether said merged input right group and said merged output right group are identical, when a result of said test is affirmative, the transaction is integral under said monodromy; and
85) said transaction is integral when, for every monodromy in said set of monodromies, said transaction is integral under said monodromy.

10. A computer-readable storage medium in which a computer program is stored, when said computer program is executed by a processor, implementing a method according to claim 9.

11. A computer-readable storage medium in which a computer program is stored, when said computer program is executed by a processor, implementing a method according to claim 1.

12. A computer-readable storage medium in which a computer program is stored, when said computer program is executed by a processor, implementing a method according to claim 2.

13. A blockchain method, comprising:
S1. receiving information of a transaction or information of a first block, said information of said first block comprises of packed information of transactions;
S2. verifying whether said transaction or each of the transactions in said first block is legal; and
S3. under the circumstance that said first block is legal, appending said first block after a tail of data of a local blockchain; under the circumstance that said transaction is legal, keeping said transaction, periodically packing received legal transactions into a second block, appending said second block after the tail of data of said local blockchain and broadcasting information of said second block to other nodes in a blockchain network;
wherein said transaction or each of the transactions in said first block comprises of tokens, and each of said tokens comprises of a value and a right set said right set is a set of rights; each of said rights is a reference to a node in a right forest;
said value is a number;
said right forest comprises of a collection of right trees; each of said right trees is a tree data structure; each node of each of said right trees comprises of a description of scope of rights; a node of each of said right trees may have a pair of child nodes, called child node pair, wherein scopes of rights of said child nodes supplement each other within a scope of said node;
wherein the step verifying that a transaction is legal comprising a step for verifying that said transaction is integral, the method for verifying that said transaction is integral further comprising:
21) splitting each token in a group of input tokens of said transaction or a group of output tokens of said transaction into one or more simple tokens, such that each of said simple tokens is a token with a right set containing only one right in a right set of said token and a value identical to a value of said token; adding said simple tokens to a simple group of input tokens or a simple group of output tokens respectively; and
22) until said simple group of input tokens and said simple group of output tokens are identical or there are no more simple tokens that can be merged, merging simple tokens in said simple group of input tokens or in said simple group of output tokens according to any of steps 221, 222, and 223; when said simple group of input tokens and said simple group of output tokens are identical, said transaction is integral:
221) when there exist two simple tokens in said simple group of input tokens or in said simple group of output tokens having identical values and complementary rights under one parent right, merging said two simple tokens into a simple token comprising said value and a right set containing said parent right only in said simple group of input tokens or said simple group of output tokens respectively;
222) when there exist two simple tokens in said simple group of input tokens or in said simple group of output tokens having different values and complementary rights under one parent right, replacing said two simple tokens with two new simple tokens respectively, one of said two new simple tokens comprising a value of lesser of values of said two simple tokens and a right set containing only said parent right; one of said new simple token having a value of difference of values of said two simple tokens and a right set identical to a right set of a simple token having greater value of said two tokens; and 223) when there exist two simple tokens in said simple group of input tokens or in said simple group of output tokens having the same right set, merging said two simple tokens into a simple token respectively with value being a sum of values of said two simple tokens and a right set identical to said right set.

14. A computer-readable storage medium in which a computer program is stored, when said computer program is executed by a processor, implementing a method according to claim 13.

15. A blockchain method, wherein during circulation of tokens in blockchain system, constructing transaction per user; sending data of said transaction to a blockchain node; wherein said transaction comprises of tokens; each of said tokens comprises of a value and a right set; said value is one of: a number, a geometric object, a monodromy; said right set is a set of rights; said right is a reference to a node in a right forest; said right forest is a collection of right trees; said right tree is a tree structure; each node in said right tree comprises of a description of right scope; said node may have a pair of sub-nodes, called sub-right node pair, wherein right scopes of said sub-nodes supplement each other within right scope of said node;

said step of constructing transaction comprising splitting right or merging rights; the method for splitting right comprising:

splitting a right set of an input token into two complementary subsets; constructing two output tokens with a value of said input token as values of said two output tokens, and with said subsets as right sets of said two output tokens respectively; and the method for merging rights comprising:

merging right sets of two input tokens having identical values to form a merged right set; constructing an output token with value of said input tokens as value of said output token, and with said merged right set as right set of said output token.

16. A blockchain system comprising a plural number of nodes and a plural number of terminals, said nodes and said terminals are connected to an Internet and communicating with each other through the Internet;

at least one of said terminals is configured to construct a transaction according to the blockchain method of claim 15, and transmitting said transaction to one or more of said nodes;

at least one of said nodes is configured to receive a transaction transmitted by one of said terminals or a second block transmitted by another of said nodes, said second block comprises of packed transactions; said node is configured to verify whether said transaction or each of the transactions in said second block is legal according to the blockchain method of claim 2; under the circumstance that said second block is legal, appending said second block after a tail of local blockchain data; under the circumstance that said transaction is legal, keeping said transaction, periodically packing received legal transactions into a third block, appending said third block to the tail of said local blockchain data and broadcasting information of said third block to at least one other node of said nodes in said blockchain system.

17. A blockchain system comprising a plural number of nodes and a plural number of terminals, said nodes and said terminals are connected to an Internet and communicating with each other through the Internet;

at least one of said terminals is configured to construct a transaction according to the blockchain method of claim 15, and transmitting said transaction to one or more of said nodes;

at least one of said nodes is configured to receive a transaction transmitted by one of said terminals or a second block transmitted by another of said nodes, said second block comprises of packed transactions; said node is configured to verify whether said transaction or each of the transactions in said second block is legal according to the blockchain method of claim 3; under the circumstance that said second block is legal, appending said second block after a tail of local blockchain data; under the circumstance that said transaction is legal, keeping said transaction, periodically packing received legal transactions into a third block, appending said third block to the tail of said local blockchain data and broadcasting information of said third block to at least one other node of said nodes in said blockchain system.

18. A blockchain system comprising a plural number of nodes and a plural number of terminals, said nodes and said terminals are connected to an Internet and communicating with each other through the Internet;

at least one of said terminals is configured to construct a transaction according to the blockchain method of claim 15, and transmitting said transaction to one or more of said nodes;

at least one of said nodes is configured to receive a transaction transmitted by one of said terminals or a second block transmitted by another of said nodes, said second block comprises of packed transactions; said node is configured to verify whether said transaction or each of the transactions in said second block is legal according to the blockchain method of claim 10; under the circumstance that said second block is legal, appending said second block after a tail of local blockchain data; under the circumstance that said transaction is legal, keeping said transaction, periodically packing received legal transactions into a third block, appending said third block to the tail of said local blockchain data and broadcasting said third block to at least one other node of said nodes in said blockchain system.

* * * * *